(12) United States Patent
Raciborski (10) Patent No.: US 8,121,997 B2
(45) Date of Patent: Feb. 21, 2012

(54) UNIVERSAL SEARCH ENGINE

(75) Inventor: Nathan F. Raciborski, Phoenix, AZ (US)

(73) Assignee: Limelight Networks, Inc., Tempe, AZ (US)

( * ) Notice: Subject to any disclaimer, the term of this patent is extended or adjusted under 35 U.S.C. 154(b) by 393 days.

(21) Appl. No.: 11/054,783

(22) Filed: Feb. 9, 2005

(65) Prior Publication Data

US 2005/0177562 A1 Aug. 11, 2005

Related U.S. Application Data

(60) Provisional application No. 60/614,788, filed on Sep. 29, 2004, provisional application No. 60/543,228, filed on Feb. 9, 2004.

(51) Int. Cl.
*G06F 17/30* (2006.01)

(52) U.S. Cl. ........................................ 707/706

(58) Field of Classification Search ........................ None
See application file for complete search history.

(56) References Cited

U.S. PATENT DOCUMENTS

| | | | |
|---|---|---|---|
| 5,907,844 A * | 5/1999 | Guay et al. ................. 707/100 |
| 5,924,090 A * | 7/1999 | Krellenstein ................. 707/5 |
| 5,963,938 A * | 10/1999 | Wilson et al. ................. 707/4 |
| 5,987,452 A | 11/1999 | Kung | |
| 6,169,986 B1 * | 1/2001 | Bowman et al. ................. 707/5 |
| 6,459,810 B1 | 10/2002 | Cring | |
| 6,484,162 B1 | 11/2002 | Edlund et al. | |
| 6,487,553 B1 | 11/2002 | Emens et al. | |
| 6,526,402 B2 | 2/2003 | Ling | |
| 6,631,367 B2 * | 10/2003 | Teng et al. ................. 707/3 |
| 6,636,853 B1 * | 10/2003 | Stephens, Jr. ................. 707/10 |
| 6,662,177 B1 * | 12/2003 | Martino et al. ................. 707/3 |
| 6,671,681 B1 | 12/2003 | Emens et al. | |
| 6,721,736 B1 | 4/2004 | Krug et al. | |
| 6,768,997 B2 * | 7/2004 | Schirmer et al. ................. 707/102 |
| 6,807,539 B2 | 10/2004 | Miller et al. | |
| 6,832,218 B1 | 12/2004 | Emens et al. | |
| 6,944,612 B2 * | 9/2005 | Roustant et al. ................. 707/706 |
| 7,092,938 B2 * | 8/2006 | Brown et al. ................. 707/4 |
| 7,287,018 B2 * | 10/2007 | Lennon ................. 707/2 |
| 7,328,177 B1 * | 2/2008 | Lin-Hendel ................. 705/27 |
| 7,392,249 B1 * | 6/2008 | Harris et al. ................. 707/5 |
| 2002/0059192 A1 | 5/2002 | Ling | |
| 2002/0099720 A1 * | 7/2002 | Bansal ................. 707/104.1 |
| 2003/0093409 A1 | 5/2003 | Weil et al. | |
| 2003/0126114 A1 | 7/2003 | Tedesco | |
| 2003/0149688 A1 | 8/2003 | Maeno | |
| 2003/0177111 A1 * | 9/2003 | Egendorf et al. ................. 707/3 |

(Continued)

*Primary Examiner* — Apu Mofiz
*Assistant Examiner* — Thu Nga Nguyen
(74) *Attorney, Agent, or Firm* — Kilpatrick Townsend and Stockton LLP (57) ABSTRACT

According to the invention, a search system for searching intranet datasets and Internet datasets is disclosed. Included in the search system are a first interface portion, a preference and a search translation unit. The first interface portion receives a search query from an end user. A preference indicates a target search engine referenced by the search query. The preference is modifiable by the end user. The target search engine cannot be determined from the search query alone. The target search engine may operate upon an intranet dataset or an Internet dataset. The search translation unit that determines the target search engine indicated by the preference. The search translation unit also translates the search query with a syntax used by the target search engine to create a translated search query. The search translation unit is hosted within an intranet used by the end user.

19 Claims, 7 Drawing Sheets

U.S. PATENT DOCUMENTS

| | | |
|---|---|---|
| 2003/0187832 A1 | 10/2003 | Reader |
| 2003/0204501 A1 | 10/2003 | Moon |
| 2003/0229624 A1 | 12/2003 | Petrisor et al. |
| 2004/0024751 A1 | 2/2004 | Petrisor et al. |
| 2004/0049494 A1 | 3/2004 | Kottisa |
| 2004/0059728 A1 | 3/2004 | Miller et al. |
| 2004/0078361 A1 | 4/2004 | Hu et al. |
| 2004/0098375 A1 | 5/2004 | DeCarlo, III |
| 2004/0162820 A1 | 8/2004 | James et al. |
| 2004/0167890 A1 | 8/2004 | Eyal |
| 2004/0215608 A1 | 10/2004 | Gourlay |
| 2005/0004911 A1* | 1/2005 | Goldberg et al. ............ 707/7 |
| 2006/0155691 A1* | 7/2006 | Lowe et al. ............ 707/3 |
| 2007/0260594 A1* | 11/2007 | Lewak et al. ............ 707/4 |

* cited by examiner

UNIVERSAL SEARCH ENGINE

This application claims the benefit of and is a non-provisional of both U.S. application Ser. No. 60/543,228, filed on Feb. 9, 2004; and U.S. application Ser. No. 60/614,788, filed on Sep. 29, 2004, which are both incorporated by reference in their entireties for all purposes.

BACKGROUND OF THE DISCLOSURE

This disclosure relates in general to searching and, more specifically, but not by way of limitation, to an electronic search engine.

Searching for information with a computer is frustrating. There are local searches, Internet search engines, web site search fields, etc. Some search features use a Boolean search format, while others use natural language. Even those that use the Boolean search function have wildly varying syntax. Effective searching is not practical except for the most determined and sophisticated users.

Conventionally, each search engine has its own interface and syntax. Interfaces can have command lines, check boxes and other controls that allow describing a search query. The syntax is somewhat standardized between different search engines with many relying upon some variation of Boolean syntax. Effective searching relies upon knowledge of the semi-custom syntax and interface for each search engine.

There are metacrawlers that are a search engine or a software program that displays results from multiple search engines. For example, DogPile™ can take a given search query and provide results from a number of search engines. There are similar metacrawlers that search databases of all types such as travel databases and auction listings. The listings from these multiple search engines are displayed in a unified readout.

BRIEF SUMMARY OF THE INVENTION

According to the invention, a search system for searching intranet datasets and Internet datasets is disclosed. Included in the search system are a first interface portion, a preference and a search translation unit. The first interface portion receives a search query from an end user. A preference indicates a target search engine referenced by the search query. The preference is modifiable by the end user. The target search engine cannot be determined from the search query alone. The target search engine may operate upon an intranet dataset or an Internet dataset. The search translation unit that determines the target search engine indicated by the preference. The search translation unit also translates the search query with a syntax used by the target search engine to create a translated search query. The search translation unit is hosted within an intranet used by the end user.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one(s) of the similar components having the same first reference label irrespective of the second reference label.

DETAILED DESCRIPTION OF THE PREFERRED EMBODIMENT

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to, portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

In one embodiment, a universal search function allows an integrated, client-side approach to searching. A single interface is used that can interface with any number of search functions or perform searching itself. A single command line could be used with a syntax that can be translated for the target search engine. The user could specify what types of searches are sent to which target search engines. For example, the user could specify that all web searches would go to Google™ or DogPile™ for them to return results. Additionally, the search could be performed of auction sites, price comparison sites, patent database sites, article archive sites, newsgroups, user forums, travel sites, real estate sites, commercial databases, classified ad sites, local storage media, network storage media, etc. using the same interface.

The user could specify that local searches be performed with the Microsoft™ Windows search feature, use another local search engine, or use a search engine integral with the universal search function. The search engine of the universal search function may have the ability search on the local machine, within the intranet and/or on the Internet in various embodiments.

An example of one syntax is shown in the below Tables I, II and III. In this example, a domain prefix would appear first, then the search string and the switches. This is the syntax for the command line embodiment. Generally, the domain prefix specifies the search engine(s) to use or search engine to use within a particular domain. The switch suffix allows further customization. Multiple domain prefixes and switch suffixes are possible in a given search query string.

TABLE I

Syntax of Domain Prefixes for Command Line

| Domain Prefix | Customize | Explanation |
|---|---|---|
| LAN: | No | All storage on network |
| WAN: | Yes | Intranet web site |
| Net: | Yes | Internet search of chosen search engine accessible on the Internet |
| X: | No | Searches the X drive, but any drive and/or path can be specified |
| $: | Yes | Searches the financial search engine of choice for news or stock quotes |
| Q: | Yes | Retrieves a stock quote for a ticker symbol or looks-up the ticker symbol if the search term cannot be found |
| Frm: | Yes | Search the previously selected forum(s) |
| News: | Yes | Search the previously selected newsgroup source |
| CA: | Yes | Search the previously selected classified ad site(s) |
| Auct: | Yes | Searches the previously selected auction site(s) |
| Leg: | Yes | Search for legislation in the previously selected jurisdiction(s) |
| Pat: | Yes | Searches the patent database(s) of choice |
| Tr: | Yes | Searches the travel web site of choice |
| Google: | No | Passes query to the Google ™ search engine |
| Y!: | No | Passes query to the Yahoo ™ search engine |
| Expedia: | No | Passes query to the Expedia ™ search engine |

TABLE II

Syntax of Search Terms for Command Line

| Term | Customize | Explanation |
|---|---|---|
| AND | Yes | Searches for both key words joined by term |
| OR | Yes | Searches for either key word joined by term |
| NOT | Yes | Excludes results that include the key word after the term |
| $ | Yes | Single wildcard character |
| * | Yes | One or more wildcard characters |

TABLE III

Syntax of Domain Suffix Switches for Command Line

| Switch Suffix | Customize | Explanation |
|---|---|---|
| b | No | Force Boolean interpretation |
| nl | No | Force natural language interpretation |
| 1 | No | Activate the first search result that is returned (e.g., automatically pull-up the web page of the first link) |
| X | Yes | Define the number of search results to show on one page |
| $l | No | Sort results from lowest price to highest price |
| $h | No | Sort results from highest price to lowest price |
| dX | Yes | Only waits for a result for X number of seconds before displaying output |
| l | No | Force a language other than the default previously chosen |
| sX | Yes | Force use of syntax X |
| n | No | Force no translation of syntax for target search engine |
| "X" | Yes | Search for term X in object found by search string |

The search terms can use a defined syntax in one embodiment that can be customized by the user. Wild cards, exact phrasing, words to exclude, connectors, etc. are defined for the search phrase portion of the command line entry. For example, a Boolean AND could be the default, but could be redefined by the user as a space between two search terms instead. Table II is an example of a Boolean type of commands available within the search phrase portion. One embodiment provides a plain-language explanation of the current syntax in the universal search function so the user can observe how the search query is being interpreted.

A given search query can target multiple search engines. Two prefixes can be used with a "/" separating them to denote that both search engines should be searched. For example, C:/Google: will search both the local C drive and Google™. Additionally, Boolean operators can be used for prefixes, for example, the AND operator would only display results that matched from two search engines.

Changes to the syntax are as simple as editing a field in the explanation fields of the current status. For example, the default Boolean syntax to search for two terms could be AND, but the user could modify this to the "*" character. Modification can be done with configuration screens in one embodiment. In another embodiment, the user can ask that the input syntax be displayed by the interface. All the syntax is displayed and the user can edit any field of their choosing. Those changes can be optionally saved in the configuration for the specified syntax.

Some embodiments could use a graphical user interface (GUI) for selecting various options in addition to the line for the search string. The GUI could have different settings to allow for searchers of varying levels of experience (i.e., advanced, intermediate, beginner). Also, the GUI could work in Boolean mode, natural language mode or a mode that would allow either. The syntax for the command line could be selectable by the user. There are many variations of syntax in circulation today, and the user could select from the more popular ones, modify one, or define a new one. Regardless of the syntax chosen, appropriate translation would be performed for the target search engine.

Status information could be provided to the user. Any syntax not supported by the target could be noted in a status window after submission. Also, the translated syntax actually submitted to the target search site could be shown such that the user could observe what the universal search function had done. Some embodiments show the syntax built by the GUI such that the user can see what command line equivalent would accomplish the same result as interacting with the GUI.

The command line and/or GUI (i.e., universal search interface) could be integral with a web browser or other application as a tool bar. When integral with the browser, JAVA™ or ActiveX™ scripting or a plug-in could be used. Some embodiments use a separate window for the universal search interface. In one embodiment, the address field of the browser (i.e., the field that normally accepts the URI) could also serve as the interface to the universal search function. A particular search string could be save as a favorite or link to allow easy access to the search at a later time. The link would function like any other URL link in the operating system.

In one embodiment, the universal search function checks the resulting objects. Where a link is broken because the target object or data is no longer available, it can be excluded from the results. Each object can be checked for the search term again to be sure it still includes the searched for criteria. Sponsored links that do not qualify under the search criteria could be removed in this manner. Many databases are based upon prior search results such as web page search engines. When a particular search against the historical data is made, the results could be checked again to confirm their continued relevance.

One embodiment would allow the universal search function to submit the query to multiple sites. The results could be displayed on the same web page or in separate web browser windows. When on the same page, a frame could be used or the results could be reformatted in a integrated list. One embodiment displays the results in a grid format.

Where the input to the universal search function does not make sense or yields few results, the universal search function could try to determine what the user meant. Possible spelling errors could be checked client-side and noted in the status. Clicking on the correct spelling in the status would search for the corrected term. Small non-English terms could be checked against ticker symbols and a price quote could be presented if there were a corresponding ticker symbol.

Some databases could require a user to log-in before a query can be made. The universal search function could store various passwords for the user. Once the user authenticates or logs-into the universal search function, the stored login information could be used to search the databases that require authentication. In some cases, the universal search function could have its own authentication information or a back door that avoids authentication for databases that might normally require each query to be associated with an authenticated user.

A number of variations and modifications of the disclosed embodiments can also be used. For example, the universal search function could be provided with an ASP model and hosted by a remote web site or on a web site remote to the user and maintained by the ISP. The universal search function could be implemented in HTML, application software, scripting languages (e.g., JAVA™, ActiveX™, etc.), operating system software, a browser plug-in, a tool bar, etc.

Figure 1A:
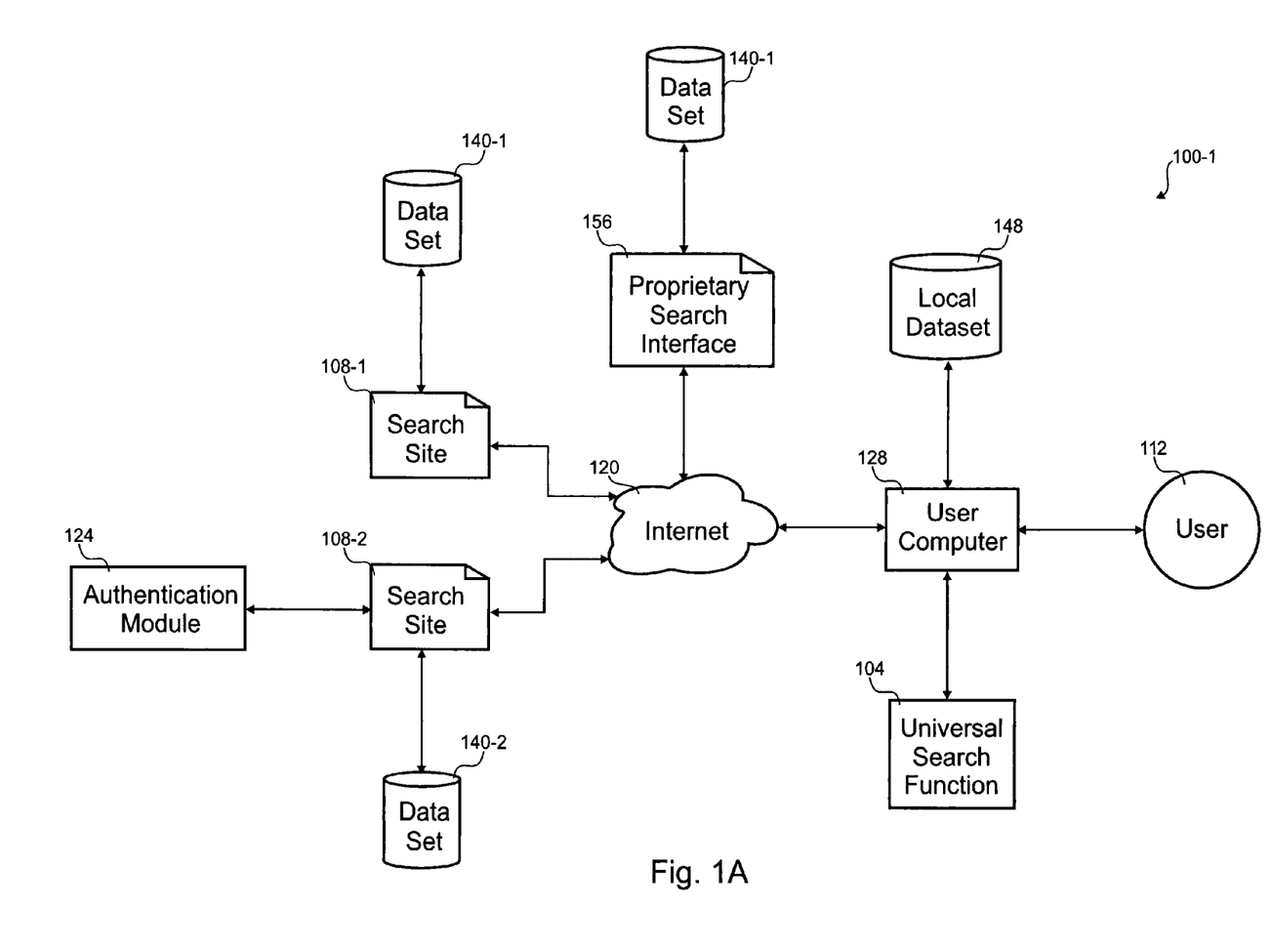
FIGS. 1A, 1B and 1C are block diagrams of embodiments of a search system.

Referring initially to FIG. 1A, a block diagram of an embodiment of a search system 100-1 is shown. This embodiment shows only two search sites 108 and a proprietary search interface 156 on the Internet, but there could be any number of search sites 108, proprietary search interfaces 156 or local datasets 148 available to search in various embodiments. A user 112 interacts with a user computer 128 to call a universal search function 104. The user computer 128 can have one or more local datasets 148 for searching.

The local dataset 148 could be anything searchable from the user computer. For example, the dataset could be all files available on the user computer or any other database. The user computer may have a search interface tool for the local dataset 148 or other database or could rely upon a search engine that is part of the universal search function 104. The local dataset 148 could be directly coupled to the user computer, stored on the user computer, or available over an intranet or local area network. Examples of these types of local datasets include a file system on a storage medium, a network directory service, a proprietary database locally accessible, a library catalog, local databases, knowledge databases, electronic help systems, and research tools. Any software that has a Boolean-type or graphical user interface (GUI) for searching is a suitable target for the universal search function 104.

Commonly, datasets 140 are remotely located with respect to the user computer and rely upon the Internet 120 for interaction. A search site 108 is typically a web site with a HTML type interface or could be a proprietary search interface 156 that is accessed by software hosted locally or remotely to the user computer 128. The dataset 140 could be related to anything that a user might want to search. In some cases, a particular search site 108 may ask user's to login or otherwise authenticate their identity. An authentication module 124 stores login names and passwords to check for proper authentication. Other embodiments of the authentication module 124 could use any biometric or passcode type verification.

Figure 1B:
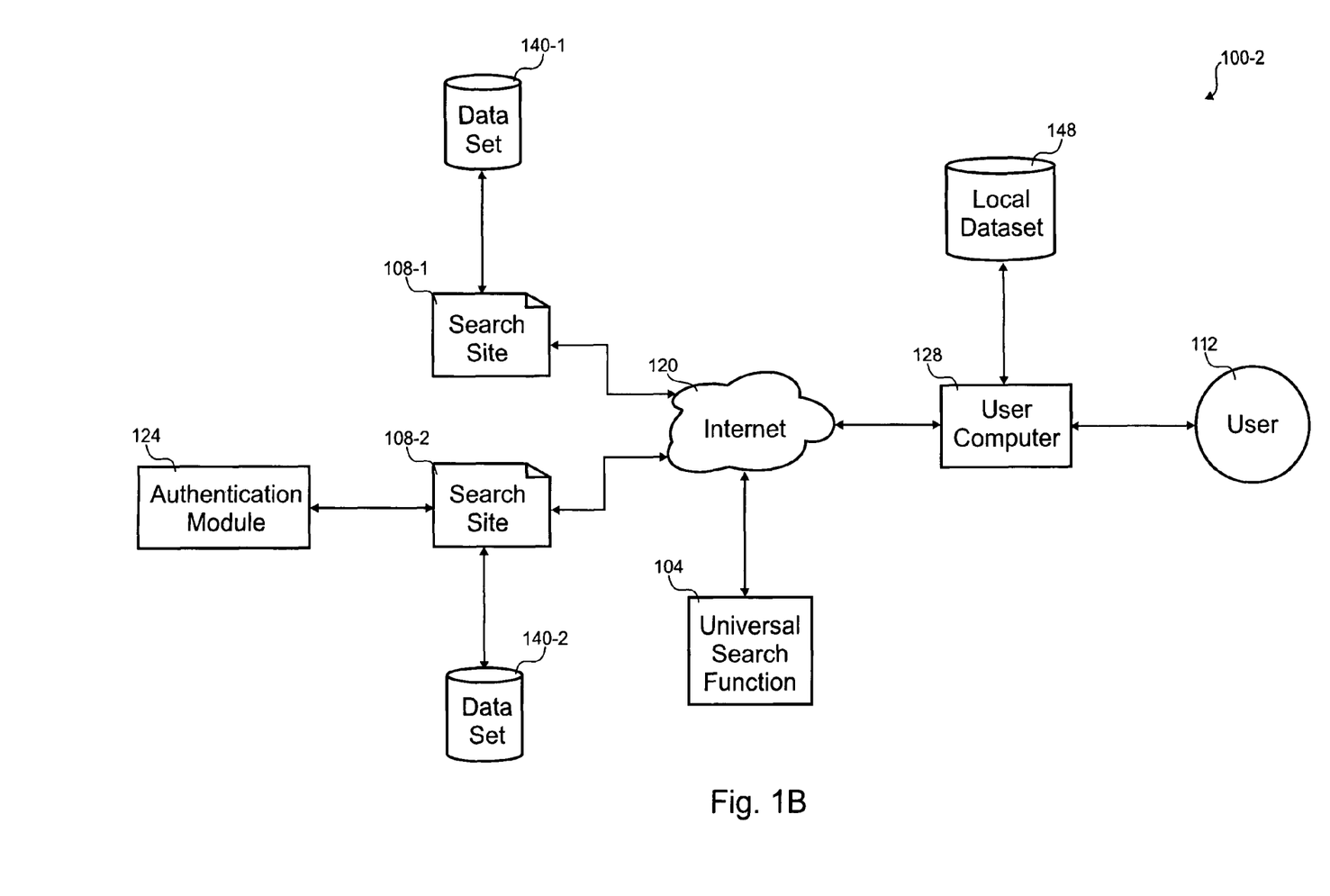

With reference to FIG. 1B, a block diagram of another embodiment of the search system 100-2 is shown. In this embodiment, the universal search function 104 is located away from the user computer 128. The user can access the universal search function 104 using the Internet 120. Other embodiments could separate the universal search function 104 using a LAN, WAN, VPN or other technology.

Figure 1C:
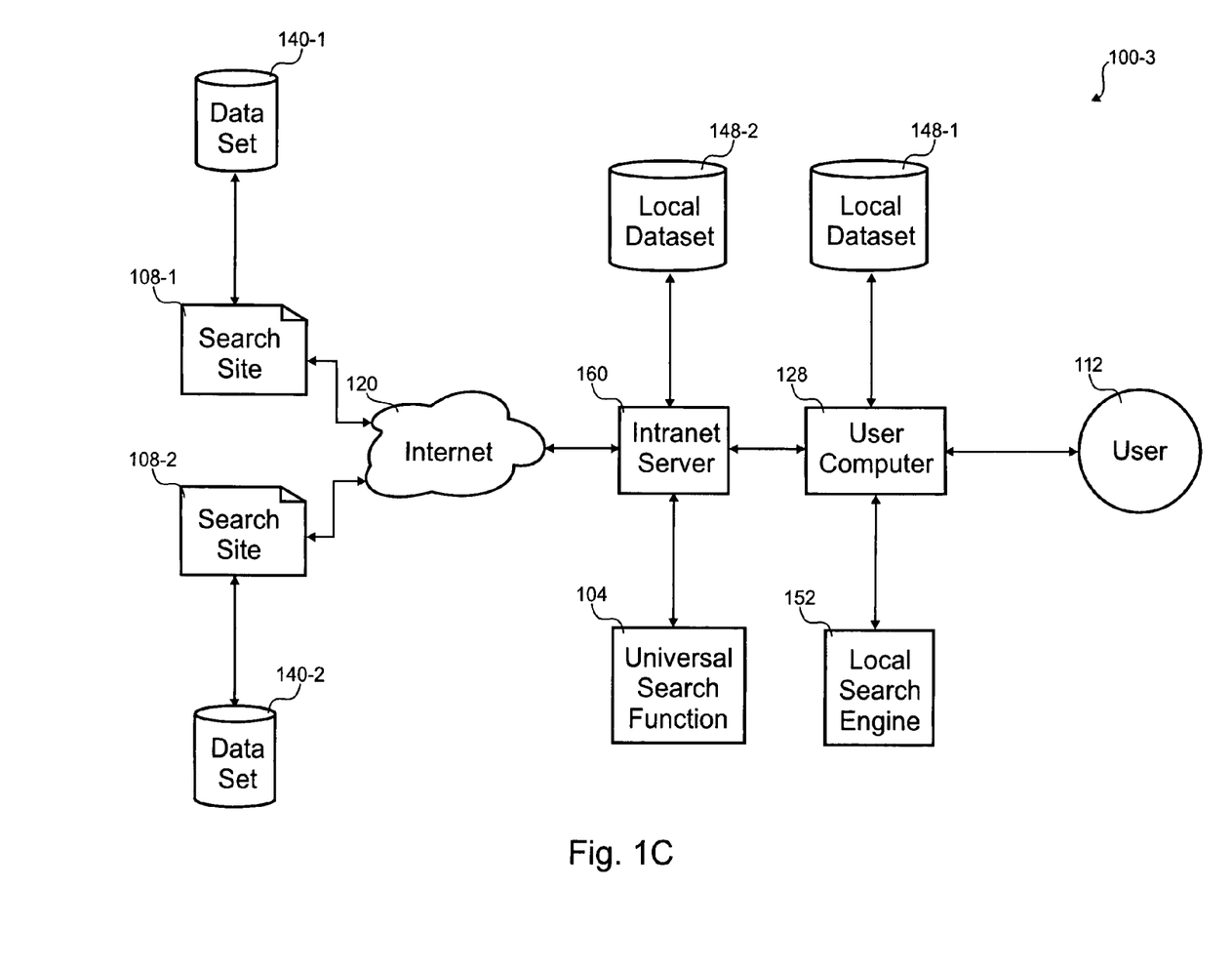

Referring to FIG. 1C, a block diagram of yet another embodiment of the search system 100-3 is shown. This embodiment shows a local search engine 152 that is accessible to the user computer 128. A local dataset 148-1, accessible through the user computer 128, is available for searching from the local search engine. A second local dataset 148-2, accessible through an intranet server 160, is also available for searching from a universal search function 104. In this embodiment, the universal search function 104 is hosted from the intranet server 160. The search sites 108 in this embodiment do not use authentication.

Figure 2A:
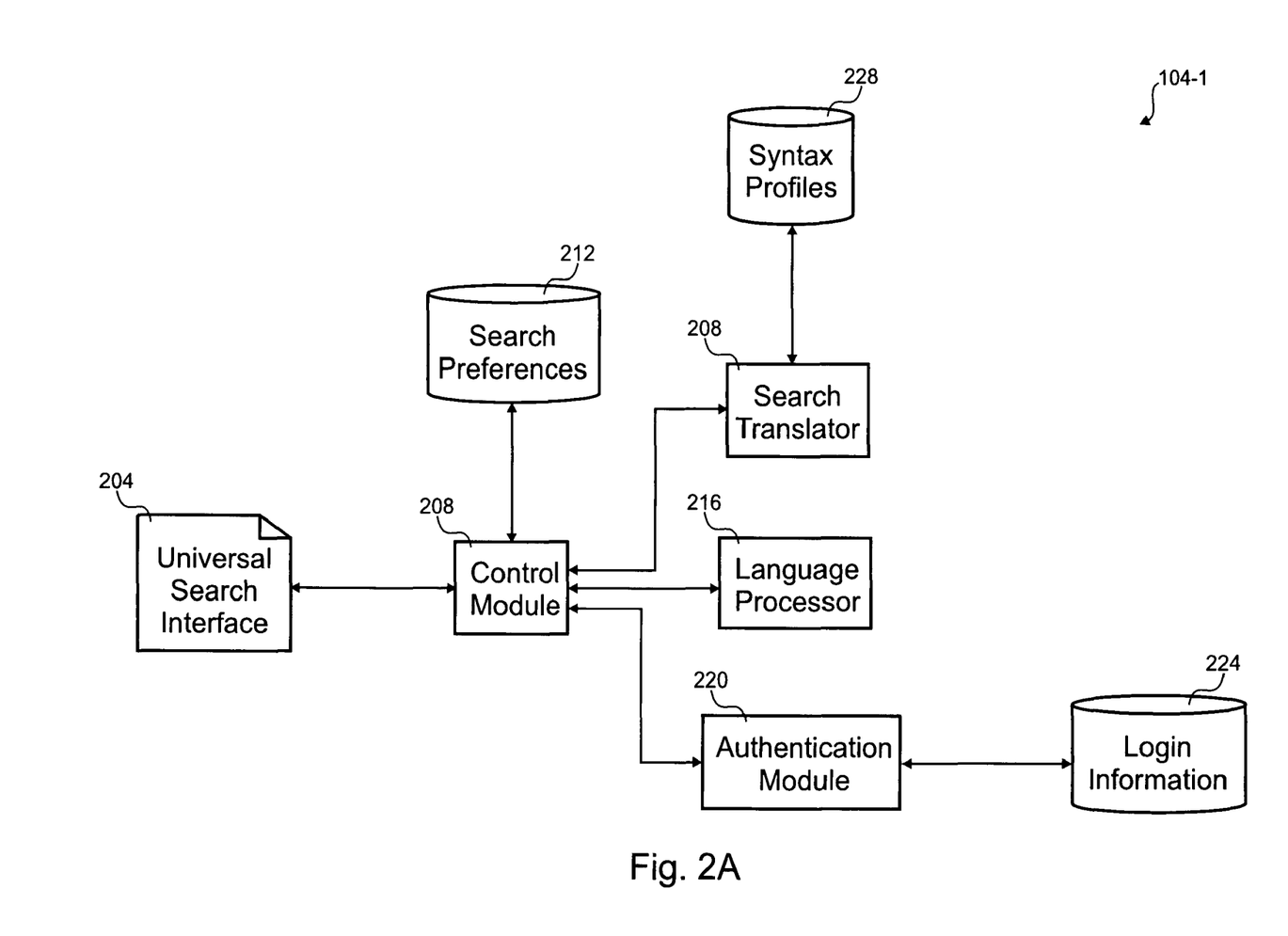
FIGS. 2A and 2B are block diagrams of embodiments of an universal search function.

With reference to FIG. 2A, a block diagram of an embodiment of the universal search function 104-1 is shown. As discussed above, the universal search function 104-1 may be local to the user computer 128, across an intranet or across the Internet 120. HTML, application software, scripting languages (e.g., JAVA™, ActiveX™, etc.), operating system software, a browser plug-in, and/or a tool bar could be used to implement the universal search function 104-1. Included in the universal search function 104-1 are a universal search interface 204, a control module 208, a search preferences database 212, an authentication module 220, a login information database 224, a language processor 216, a search translator 208, and a syntax profile database 228.

The universal search interface 204 provides the command line and/or GUI that the user interacts with when entering a search query, configuring the universal search function 104 or reviewing search results. The universal search interface 204 could be application software or an interpreted interface such as HTML. Any type of computer or device could be used to display the universal search interface 204, for example, a personal computer, a mobile phone, a PDA, set top box, tablet computer, etc.

The operation of the universal search function 104-1 is largely regulated by the control module 208. Software and/or hardware could be used to implemented the control module 208. User information is stored by the control module 208 in the search preferences database 212. This database holds the customizations selected for each user along with any customizations to any syntax profiles.

The search translator 208 interfaces with the syntax profile database 228 to provide various syntax profiles and translate among them. A sample syntax profile is shown in the above Tables I, II and III. Should the user edit a syntax profile, it is stored in the search preference database 212. When a particular user uses the universal search function, any customized syntax profiles are loaded into the search translator 208. When a search query is entered, the search translator 208 parses the query with the input syntax profile and translates that using an output syntax profile. The resulting search query is provided to the control module 208, which presents it to the appropriate search engine.

Natural language queries are possible in this embodiment. The language processor 216 parses the input search query to produce a Boolean equivalent that is presented to the search translator 208 for conversion into the resulting search query. Foreign languages can also be understood and translated by the language processor 216. When an input search query is provided with a command line or GUI interface, the language processor 216 can formulate a natural language equivalent for presentment back to the user. Review of the natural language equivalent by the user allows quickly finding any miscommunications.

Figure 2B:
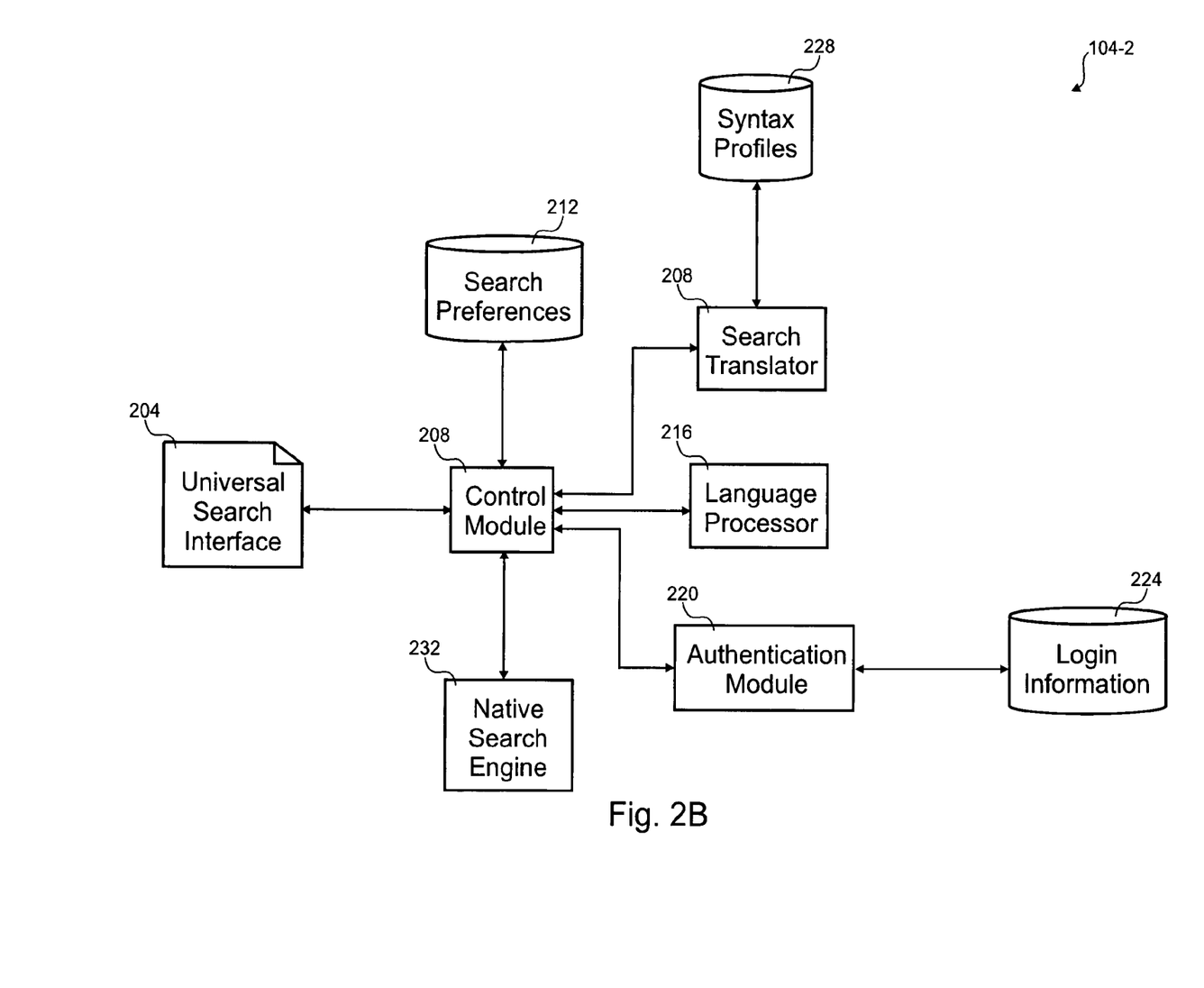

Referring next to FIG. 2B, a block diagram of another embodiment of the universal search function 104-2 is shown. This embodiment includes a native search engine 232. This search engine 232 provides the ability to directly interface with available data sets and search them. For example, the native search engine 232 could search documents, digital photos, video files, audio files, web pages, newsgroups, and general file systems. The queries to the native search engine can use any syntax before translation to the native syntax of the native search engine 232.

Figure 3:
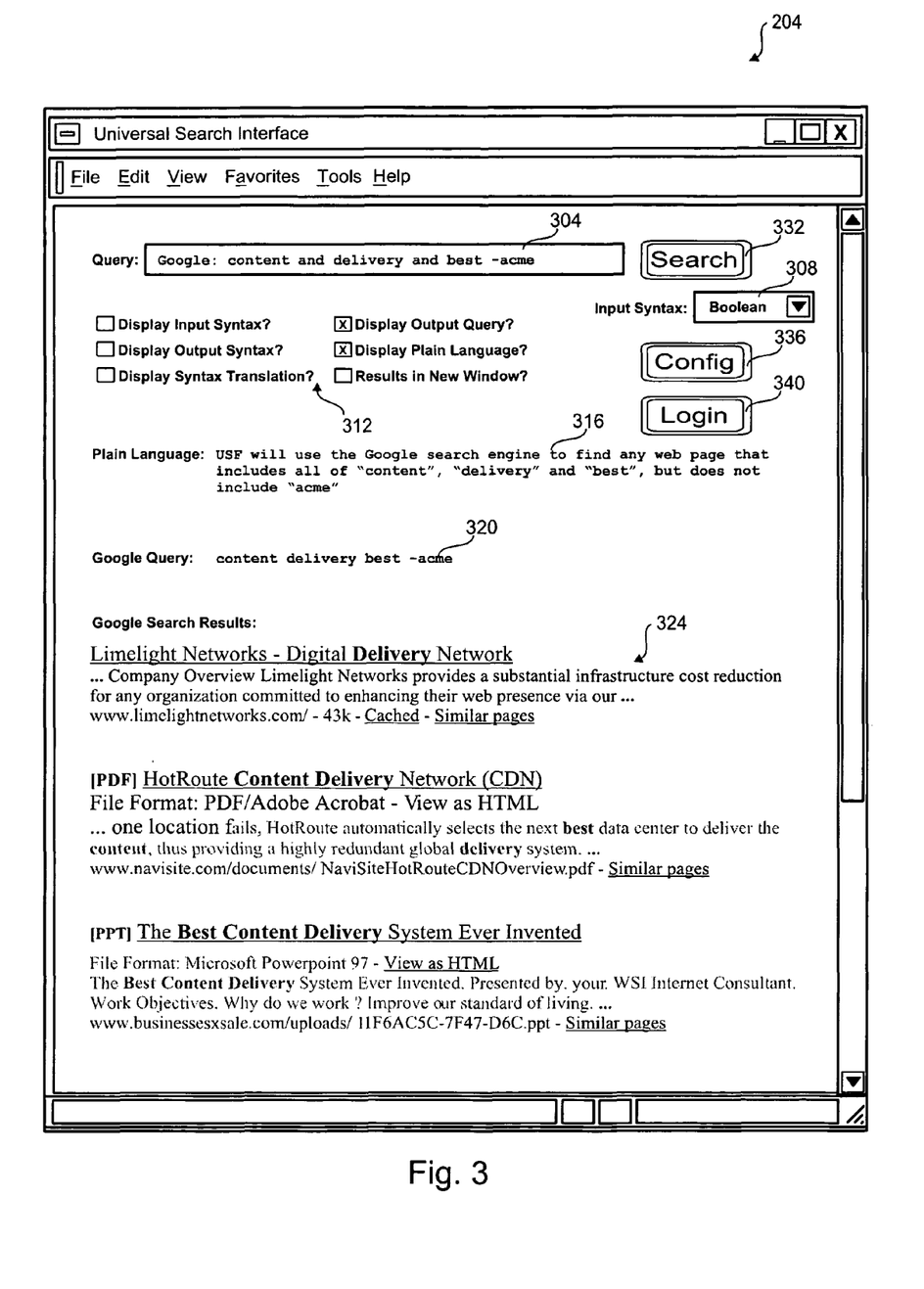
FIG. 3 is a screen shot of an embodiment of an universal search interface.

Referring next to FIG. 3, a screen shot of an embodiment of a universal search interface 204 is shown. This embodiment uses a command line 304 interface to enter the search queries, but other embodiments could have a GUI instead. An input syntax line 308 is provided for selecting a default input syntax. In this example shown in FIG. 3, the Boolean syntax is selected to search for two terms with "AND." Once the search string is entered along with any other settings, the "search" button 332 initiates the search. Any configuration or customization of the syntax can be done by selecting the "config" button 336. Where authentication is required by the target search engine, the user can authenticate with the "login" button 340.

This embodiment has check boxes 312 to allow selecting various options. The input syntax profile can be displayed. When displayed, fields in the input syntax can be modified by overwriting the particular filed with the new operator. Similarly, the output syntax profile can be displayed and modified. Any changes to the syntax profiles can be saved for use on future searches. The user can also select to have both profiles shown with the translation between the two for each operator.

Other check boxes 312 allow selecting other options. The output search query 320 can be displayed and/or a plain language equivalent 316 to the query could be shown. This example displays the search results 324 in the same window. These results 324 could be reformatted information from the search engine or a frame that includes the actual results. In other examples, the user could have the results 324 shown in a new window.

Figure 4:
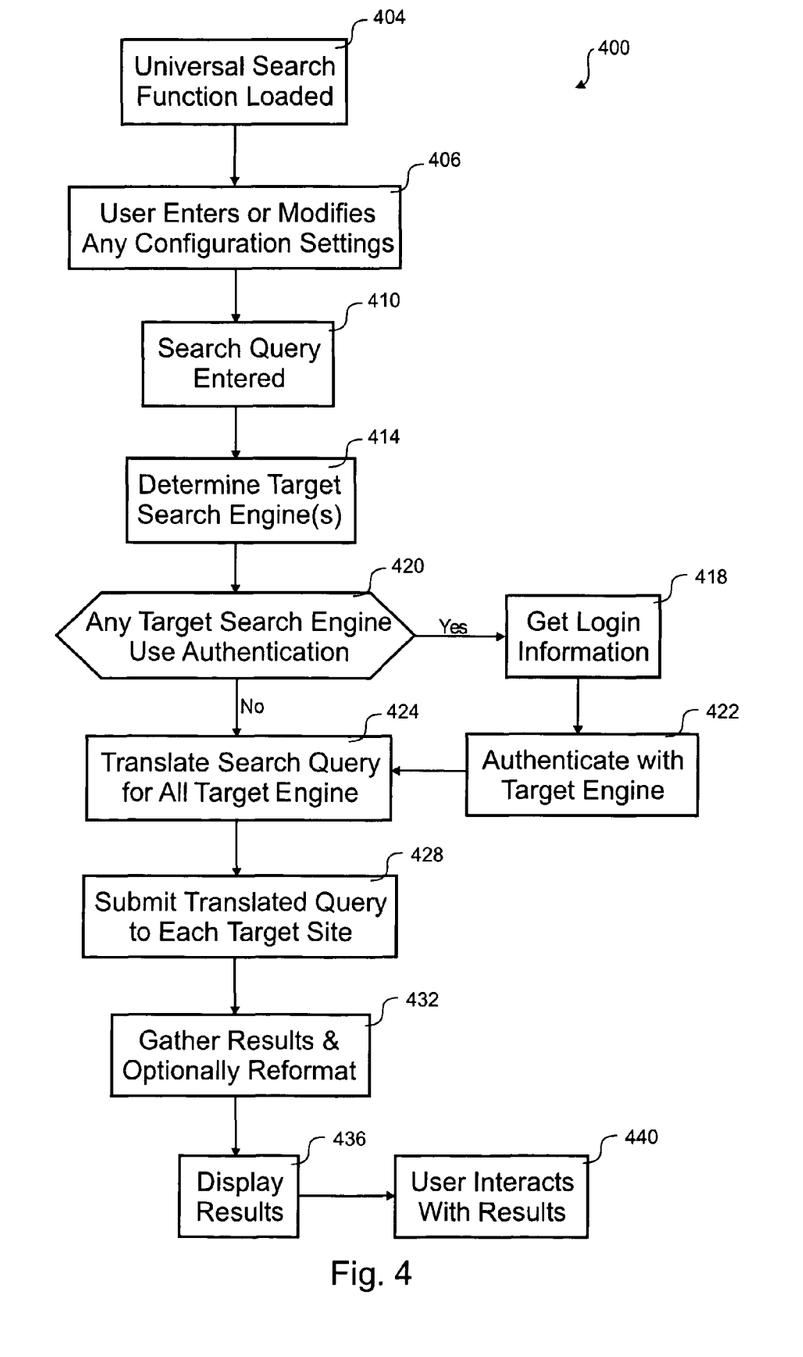
FIG. 4 is a flow diagram of an embodiment of a process for searching with an embodiment of the universal search function.

With reference to FIG. 4, a flow diagram of an embodiment of a process 400 for searching with an embodiment of the universal search function 104 is shown. The depicted portion of the process 400 begins in step 404 where the universal search function is loaded. This could be done by opening your web browser with a plug in, loading a web page, loading an application or applet, etc. In step 406, the user may modify any of the configuration settings or modifying any syntax profile.

In step 410, the search query is entered using a command line and/or GUI. The user would then start the search process. In step 414, the control module 208 determines the one or more search engines that are targeted. A determination is made in step 420 to see if any targeted search engine uses authentication. Where authentication is used, the universal search function 104 may require the user to log in before step 418, where the login information is retrieved from the search preference database 212. Where the login information was not previously gathered the user may be queried for the login information. In step 422, any authentication with the one or more target search engine is performed.

After any authentication, processing continues to step 424 where the search translator 208 gathers the source and target syntax profiles are retrieved from the syntax profile database 228. The search translator 208 converts the search query to a target search query. In some cases, the target search query may also be displayed by the universal search interface 204. The target search query is automatically entered into the target search engine(s) in step 428.

The resulting search results may be presented in a new window or an existing search window in step 432. The results can be reformatted or not during this process. The results are shown to the user in step 436. Some embodiments may not show the results, but pass them to a file or another process. The user can interact with the search results in step 440 or modify the search query before requesting results again.

While the principles of the disclosure have been described above in connection with specific apparatuses and methods, it is to be clearly understood that this description is made only by way of example and not as limitation on the scope of the invention.

APPENDIX

Attached and incorporated into this application is an appendix. This appendix includes detail on one or more embodiments of this disclosure. The appendix describes a bandwidth provisioning method and the universal search function could be a service purchased. The scope the disclosure should not be limited by the detail disclosed in the appendixes.

APPENDIX: ENHANCED BANDWIDTH PROVISION

Management of a broadband connection is daunting. Firewalls, Internet appliances, routers, e-mail servers and other hardware is maintained by information service (IS) personnel. Software such as virus detection software, spam filtering, content filters, search tools, etc. are also maintained by the IS personnel. The maintenance of the broadband connection typically far outstrips the cost of the bandwidth over the broadband connection. For broadband providers, the profit margin for the bandwidth is declining.

In an embodiment, the present invention moves many of the IS tasks are moved away from the end user or business customer. These IS tasks are broadly categorized into data scrubbing (spam filtering of e-mail, virus protection from e-mail, web pages and downloaded files, worm protection, content filtering or parental control, firewall screening, network intrusion security and wireless network security, etc.) and application service (virtual private networking (VPN) services, quality of service (QoS) management, network address translation (NAT), TCP/IP port management, Dynamic Host Configuration Protocol (DHCP), voice over Internet protocol (VOIP), software and operating system updates, remote installation and update of computer software, computer backup and archive, application hosting, ASP software, e-mail account hosting, searching software, web site hosting, etc.).

The content filtering and parental control scrubbing services could include eliminating any unwanted data destined for the subject network. In addition to denial of service attacks, worms and viruses, this could include sending of sensitive data from the company network and time wasting activities (e.g., Internet radio, picture and video viewing, newsgroups, instant messaging sessions, etc.). The content of the payloads being received or the IP address and port could be inspected to determine what type of information is being received or sent by the network. Individual user accounts on the network could have customized permissions to access various types of information.

In most cases, the hardware to support these IS tasks is located remote to the end-user location, but some embodiments could locate some or all hardware at the user location. For example, wireless access points could be installed in the user location to support wireless networking. The authentication and intrusion detection for the wireless network could be located remote to the user location.

In one embodiment, the bandwidth over the broadband connection is marketed as being free. The give-away of bandwidth could be in some way contingent on purchasing one or more related services. Some embodiments could tie the amount of free bandwidth to the number of related services purchased and/or the dollar amount of the related services. For example, a 128 KB data pipe is free with purchase of VOIP telephone service. If spam filtering and virus and worm protection is added to this, a 256 KB data pipe is provided. The bandwidth could be further scaled by the seats purchased. For example, if 10 lines of VOIP telephone service is purchased, 1 MB of bandwidth could be provided. Any number of bandwidth service levels could be provided in a way that generally correlates to the services purchased. Of course, the customer could purchase additional bandwidth separate from the purchase of IS tasks in some embodiments.

In one embodiment, a limited amount of bandwidth is given away regardless of whether any IS task is purchased. For example, a 64 KB data pipe could be provided. The user may be subjected to advertising, data gathering on Internet habits and/or mandatory surveys that could be eliminated for a fee. In some cases, the user may have to purchase the terminal equipment for receiving the bandwidth. This could be waived if a contract term for purchase certain IS tasks were formed. Alternatively, the purchase price for the terminal equipment could be refunded in whole or part if the terminal equipment is returned upon cancellation.

The hardware configuration for end-users could take many forms. Generally, a single user would only require the terminal equipment (e.g., satellite modem and dish, DSL modem, wireless modem, cable modem, optical fiber interface, power line data modem, microwave data modem and dish, etc.). Where there were multiple computers or network devices, a switch or hub could make the bandwidth available to all devices attached to the network. If the terminal equipment does not protect the bandwidth, a virtual private network or encryption could be used to protect the transported bandwidth between the terminal equipment and the bandwidth provider.

The equipment maintained by the bandwidth provider could be more easily fixed in a central location for the many customers. Some equipment could have redundant systems that take over when necessary. The bandwidth provider could maintain many spares to easily replace broken equipment. Any software or hardware for the bandwidth provider could be upgraded with minimal impact on the customer locations.

End-users could purchase some IS tasks from the bandwidth provider, while handling others internally in some embodiments. For example, the e-mail functions such as a mail server and virus and spam scanning could be offloaded to the bandwidth provider, while NAT and DHCP could be locally handled with a router in some embodiments. Various configurations could be chosen to divide locally handled services from remotely handled ones.

The bandwidth provider separates the network traffic for each customer. Systems to support the IS task are connected to each customer network that has purchased the service. The interface between the Internet and various customer intranets is located away from the user location and at one of the bandwidth provider locations. The data scrubbing functions are performed at this interface. Some data scrubbing functions could be located on either side of the interface, such as e-mail virus and spam detection.

The customer can configure options through a web or application interface to the various systems. For example, the NAT function and port management could be located at the bandwidth provider location and accessed by the user through a web page on the intranet. Any configuration screens could be accessed on the intranet by authorized personnel to modify how the services performed if desired.

Concise Descriptions of Some Embodiments:

1. A method for scrubbing a bandwidth allocation to a customer, the method comprising steps:
  coupling bandwidth provider equipment to an intranet; and
  coupling network devices of a customer to the intranet, wherein:
    the bandwidth provider equipment is remotely located from the network devices, and
    intranet is broadband between the bandwidth provider equipment and the network devices.

2. A computer system adapted to perform the computer-implementable method for scrubbing the bandwidth allocation of claim 1.

3. A method for providing bandwidth from a wide area network (WAN) that is coupled with related services, the method comprising:
  bundling a predetermined amount of wide area network bandwidth with a service;
  receiving a customer order for the bundle;
  provisioning the bundle, wherein at least part of the service is performed away from a customer location.

4. A computer system adapted to perform the computer-implementable method for providing bandwidth from the WAN of claim 3.

5. A method for provisioning Internet services and bandwidth, the method comprising steps of:
provisioning an Internet service for a customer; and
automatically including an increment of bandwidth provisioning to the customer without additional cost.

What is claimed is:

1. A search system for searching intranet datasets and Internet datasets, the search system comprising:
a first interface portion for receiving a search query from an end user;
a preference that indicates a target search engine referenced by the search query,
wherein:
the preference is modifiable by the end user,
the target search engine cannot be determined from the search query alone, and
the target search engine may operate upon an intranet dataset or an Internet dataset; and
a search translation unit that:
determines the target search engine indicated by the preference,
determines an input syntax selected by the end user, wherein:
the selected input syntax is one of a plurality of sets of input syntaxes,
each set of the plurality of sets includes a plurality of operator terms, and
the plurality of operator terms include operator terms that implement a Boolean AND and OR operations on terms of the search query, and
translates the search query with the user selected input syntax, which is comprised of a first plurality of operator terms, to a translated search query with a syntax used by the target search engine that is comprised of a second plurality of operator terms, wherein:
the search translation unit is:
at least partially embodied in hardware; and
hosted within an intranet used by the end user,
the first plurality of operator terms uses different operator terms to perform a same operation as the second plurality of operator terms,
the first plurality of operator terms are not natively supported by the target search engine, and
operator terms of the plurality of sets of input syntaxes are customizable by the end user, and the user customizable operator terms determine how terms of the search query with the user selected input syntax are translated by the search translation unit.

2. The search system for searching intranet datasets and Internet datasets as recited in claim 1, wherein the search query is defined by at least one of:
entry of a text string into a command line interface; and
manipulation of a graphical user interface.

3. The search system for searching intranet datasets and Internet datasets as recited in claim 1, wherein modification of the preference changes the target search engine.

4. The search system for searching intranet datasets and Internet datasets as recited in claim 1, wherein the search query indicates a plurality of target search engines that are searched.

5. The search system for searching intranet datasets and Internet datasets as recited in claim 1, wherein the translation unit is part of an application running on an intranet of the end user.

6. The search system for searching intranet datasets and Internet datasets as recited in claim 1, wherein the translation unit is part of an application running on a computing device of the end user.

7. The search system for searching intranet datasets and Internet datasets as recited in claim 1, wherein the preference indicates a plurality of target search engines to be searched.

8. The search system for searching intranet datasets and Internet datasets as recited in claim 1, wherein the translated search query is displayed automatically.

9. A method for searching both intranet datasets and Internet datasets with a single search interface, the method comprising: receiving a search query from an end user;
receiving a selection by the end user of an input syntax selected from a plurality of sets of input syntaxes;
receiving a preference that indicates a target search engine referenced by the search query, wherein:
the preference is modifiable by the end user, and
the target search engine cannot be determined from the search query alone;
determining the target search engine indicated by the preference;
translating the search query with the user selected input syntax, which is comprised of a first plurality of operator terms, to a translated search query with a syntax used by the target search engine that is comprised of a second plurality of operator terms, wherein:
the first plurality of operator terms uses different operator terms to perform a same operation as the second plurality of operator terms;
the first plurality of operator terms are not natively supported by the target search engine;
operator terms of the plurality of sets of input syntaxes are customizable by the end user, and the user customizable operator terms determine how terms of the search query with the user selected input syntax are translated;
the translation step is performed within an intranet that is used by the end user; and
sending the translated search query to the target search engine.

10. The method for searching both intranet datasets and Internet datasets with the single search interface as recited in claim 9, wherein the translating step is performed upon a computing device of the end user.

11. The method for searching both intranet datasets and Internet datasets with the single search interface as recited in claim 9, wherein the search query is defined by at least one of:
entry of a text string into a command line interface; and
manipulation of a graphical user interface.

12. The method for searching both intranet datasets and Internet datasets with the single search interface as recited in claim 9, wherein the search query indicates a plurality of target search engines that are searched.

13. A computer-readable medium having computer-executable instructions for performing the computer-implementable method for searching both intranet datasets and Internet datasets with a single search interface of claim 9.

14. A method for searching with search engines, the method comprising:
receiving a search query from an end user at a computer system;
receiving a selection by the end user of an input syntax selected from a plurality of sets of input syntaxes;

receiving a preference that indicates a target search engine referenced by the search query, wherein:
the preference is modifiable by the end user, and
the target search engine cannot be determined from the search query alone;
determining the target search engine indicated by the preference;
translating the search query with the user selected input syntax, which is comprised of a first plurality of operator terms, to a translated search query with a syntax used by the target search engine that is comprised of a second plurality of operator terms, wherein:
operator terms of the plurality of sets of input syntaxes are customizable by the end user;
the first plurality of operator terms uses different operator terms to perform a same operation as the second plurality of operator terms;
the first plurality of operator terms are not natively supported by the target search engine;
the user customizable operator terms determine how terms of the search query with the user selected input syntax are translated; and
the translation step is performed within the computer system that is used by the end user; and
sending the translated search query to the target search engine.

15. The method for searching with search engines as recited in claim 14, wherein the preference corresponds to the target search engine on a computing device of the end user and a second target search engine on the Internet.

16. A computer-readable medium having computer-executable instructions for performing the computer-implementable method for searching with search engines as recited of claim 14.

17. The search system for searching intranet datasets and Internet datasets as recited in claim 1, wherein changes to the customizable operator terms of the plurality of sets of input syntaxes by the end user may be saved for use on future searches.

18. The method for searching both intranet datasets and Internet datasets with a single search interface as recited in claim 9, wherein changes to the customizable operator terms of the plurality of sets of input syntaxes by the end user may be saved for use on future searches.

19. The method for searching with search engines as recited in claim 14, wherein changes to the customizable operator terms of the plurality of sets of input syntaxes by the end user may be saved for use on future searches.

* * * * *